United States Patent
Pfingsten et al.

(10) Patent No.: US 9,963,217 B2
(45) Date of Patent: May 8, 2018

(54) PASSENGER AIRCRAFT

(71) Applicant: Lufthansa Technik AG, Hamburg (DE)

(72) Inventors: Kai-Christoph Pfingsten, Hamburg (DE); Arno Strotmann, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 106 days.

(21) Appl. No.: 15/106,681

(22) PCT Filed: Dec. 3, 2014

(86) PCT No.: PCT/EP2014/076361
§ 371 (c)(1),
(2) Date: Jun. 20, 2016

(87) PCT Pub. No.: WO2015/090959
PCT Pub. Date: Jun. 25, 2015

(65) Prior Publication Data
US 2017/0001702 A1   Jan. 5, 2017

(30) Foreign Application Priority Data
Dec. 20, 2013 (DE) .................. 10 2013 227 042

(51) Int. Cl.
*B64C 1/06* (2006.01)
*B64D 25/00* (2006.01)
(Continued)

(52) U.S. Cl.
CPC .............. *B64C 1/068* (2013.01); *B64D 13/02* (2013.01); *B64D 25/00* (2013.01); *B64C 2001/009* (2013.01); *B64D 45/00* (2013.01)

(58) Field of Classification Search
CPC ... B64C 1/068; B64C 2001/009; B64D 13/02; B64D 25/00; B64D 45/00
See application file for complete search history.

(56) References Cited

U.S. PATENT DOCUMENTS

| 4,049,221 A | 9/1977 | Fountain |
| 4,269,376 A | 5/1981 | Haux et al. |

(Continued)

FOREIGN PATENT DOCUMENTS

| DE | 27 56 726 | 6/1979 |
| DE | 10 2009 006 395 B4 | 7/2010 |

(Continued)

OTHER PUBLICATIONS

First Examination Report dated Aug. 18, 2014, for German Patent Application No. 10 2013 227 042.9.
(Continued)

*Primary Examiner* — Valentina Xavier
(74) *Attorney, Agent, or Firm* — Saliwanchik, Lloyd & Eisenschenk (57) ABSTRACT

A passenger aircraft (10) comprising a pressurized cabin, which comprises a top volume (13) and a passenger deck (12), the passenger deck (12) comprising at least one passenger compartment (14) separated from the rest of the passenger volume (16) by walls (15), is characterized in that a burstable wall (22) that extends below the ceiling (19) of the passenger volume and defines the passenger compartment (14) is arranged so as to be adjacent to the side wall (20), the space (23) between the burstable wall (22) and the side wall (20) being open towards the top volume (13) and forming a common pressure chamber therewith.

15 Claims, 4 Drawing Sheets

(51) Int. Cl.
  *B64D 13/02* (2006.01)
  *B64D 45/00* (2006.01)
  *B64C 1/00* (2006.01)

(56) References Cited

U.S. PATENT DOCUMENTS

| | | | |
|---|---|---|---|
| 4,390,152 A | | 6/1983 | Jorgensen |
| RE32,554 E | * | 12/1987 | Murphy ............... B64C 1/18 244/118.5 |
| 5,031,860 A | | 7/1991 | Ruiz et al. |
| 5,118,053 A | * | 6/1992 | Singh ............... B64C 1/18 244/118.5 |
| 8,201,775 B2 | * | 6/2012 | Treimer ............... B64C 1/18 165/235 |
| 8,567,721 B2 | * | 10/2013 | Voss ............... B64C 1/18 244/118.5 |
| 8,955,803 B2 | * | 2/2015 | Voss ............... B64C 1/18 244/118.5 |
| 2008/0290217 A1 | | 11/2008 | Ghoreishi et al. |
| 2008/0302910 A1 | * | 12/2008 | Calamvokis ............ B64C 1/067 244/118.5 |
| 2009/0179110 A1 | * | 7/2009 | Leyens ............... B64C 1/18 244/129.4 |
| 2010/0187358 A1 | * | 7/2010 | Voss ............... B64C 1/18 244/129.4 |

FOREIGN PATENT DOCUMENTS

| | | |
|---|---|---|
| EP | 0 432 809 A1 | 6/1991 |
| EP | 0 448 308 A2 | 9/1991 |
| EP | 2 492 190 A2 | 8/2012 |
| WO | WO 2007/073787 A1 | 7/2007 |

OTHER PUBLICATIONS

International Search Report dated Feb. 5, 2015, for International Application No. PCT/EP2014/076361.

* cited by examiner

PASSENGER AIRCRAFT

CROSS REFERENCE TO A RELATED APPLICATION

This application is a National Stage Application of International Application Number PCT/EP2014/076361, filed Dec. 3, 2014; which claims priority to German Patent Application No. 10 2013 227 042.9, filed Dec. 20, 2013; both of which are incorporated herein by reference in their entirety.

FIELD OF INVENTION

The invention relates to a passenger aircraft comprising a pressurised cabin, which comprises a top volume and a passenger deck, the passenger deck comprising at least one passenger compartment separated from the rest of the passenger deck by walls.

BACKGROUND OF THE INVENTION

In particular in the field of VIP upgrades to passenger aircraft, it is routine to separate off small passenger compartments from the passenger volume as a whole for various purposes, for example as a conference room, relaxation room or media room. If the side wall of the aircraft is damaged in the region of such a passenger compartment, the sudden decompression of the pressurised cabin due to the relatively small volume of the passenger compartment leads to very high differential pressures at the boundaries and walls of the compartment, which may bring about significant and dangerous subsequent damage. To prevent this, it is known to provide permanently open flow openings, or flow openings that open as a result of a pressure differential, between the rooms in the pressurised cabin. In small passenger compartments, sufficient pressure equalisation may not be carried out, or may only be carried out using very large flow openings, but this is not compatible with the use and design concept in terms of interior design for these compartments, in particular in accordance with VIP standards.

The problem addressed by the invention is to allow separated compartments to be integrated into the pressurised cabin of a passenger aircraft such that they are safer in the event of sudden decompression.

BRIEF SUMMARY

Owing to the burstable wall according to the invention, a pressure-equalising or pressure-connection space is produced between the side wall of the aircraft and the passenger compartment (such that it is hidden from view) and is open towards the top volume. Owing to the adjacent arrangement of the burstable wall, damage to the side wall generally also leads to damage to said burstable wall, by means of which, according to the invention, a pressure connection is produced between the passenger compartment and the top volume. The connection of the passenger compartment and the top volume leads to a significant reduction in the differential pressure acting on the walls and the floor of the passenger compartment, and even to the prevention of a differential pressure acting on the ceiling of the passenger compartment, as a result of which safety is considerably increased in the event of sudden decompression. Since the passenger compartment is visually closed towards the side wall of the aircraft by the burstable wall, the use and design concept in terms of interior design for the passenger compartment is not impaired in any way.

The invention is particularly advantageously applicable to small passenger compartments, of which the volume is at most $1/10$ of the passenger cabin volume, is at most $1/5$ of the top volume or is at most 50 cubic meters.

Preferably, the entire pressure chamber extends as low as floor level of the passenger compartment. In this case, the pressure equalisation according to the invention is ensured for any damage to the side wall in the region of the passenger compartment, in particular also damage just above floor level.

Advantageously, the distance between the burstable wall and the side wall increases from the bottom to the top. While a large flow surface is provided in the region of the ceiling of the passenger compartment, this is not necessary in the region of the floor of the passenger compartment, a lower distance in this region between the burstable wall and the side wall allowing the space to be used optimally.

In order to achieve the most rapid and comprehensive pressure equalisation possible between the passenger compartment and the top volume, the distance between the burstable wall and the side wall advantageously fulfils one or more of the following conditions.

The maximum distance between the burstable wall and the side wall is advantageously at least $\sqrt{r^2-h^2}/8$, r being the fuselage radius to the point of intersection between the lower face of the ceiling of the passenger volume and the side wall, and h being the vertical distance between the level of the widest fuselage extension of the aircraft and the lower face of the ceiling of the passenger volume.

The minimum distance between the burstable wall and the side wall is at least a quarter of the maximum distance between the burstable wall and the side wall.

The distance between the burstable wall and the side wall is at most half the length of the passenger compartment.

The distance between the burstable wall and the side wall in the region of the lower face of the ceiling is at least 0.2 m.

Particularly advantageously, the maximum distance between the burstable wall and the side wall is at least $k\sqrt{r^2-h^2}/4$, k being a geometric factor which becomes greater the greater the volume of the passenger compartment and becomes smaller the longer the passenger compartment. The geometric factor k takes into account that passenger compartments may have very different volume-to-length ratios. Short spaces require greater cross-sectional widths than long spaces in order to achieve the same opening cross sections. Spaces having greater volumes require larger opening cross sections to the top volume in order to make possible an effective pressure connection between the volumes.

Advantageously, the burstable wall has a lower bursting resistance than the rest of the walls of the passenger compartment. This can preferably be implemented by means of a predetermined breaking line, the burstable wall bursting along the predetermined breaking line even when there is a relatively low pressure differential on either side, and therefore producing a pressure-equalising opening in the burstable wall. As a result, pressure equalisation is also ensured in the event that only the side wall of the aircraft, and not the burstable wall, has been damaged by a damage event.

The features of the invention can be accordingly transferred to passenger aircraft comprising more than one passenger deck, the top space being replaced by the volume between the decks in this case.

BRIEF DESCRIPTION OF THE DRAWINGS

The invention is explained in the following on the basis of preferred embodiments with reference to the accompanying drawings, in which.

DETAILED DESCRIPTION

In the following, the prior art is first explained on the basis of FIG. 4. A passenger aircraft 10 comprises a pressurised cabin 27 that is defined by a side wall 20 and comprises a lower deck 11, a passenger deck 12 and a top volume 13 which each extend over the majority of the length of the aircraft. One or more passenger compartments 14 that adjoin the side wall 20 of the aircraft 10 are arranged on the passenger deck 12. The longitudinal extension or length l of the passenger compartment 14 (see FIG. 3) is small in comparison with the length L of the passenger deck 12, i.e. is shorter by at least a factor of 5, preferably a factor of 10. The lateral extension w of the passenger compartment 14 is generally smaller, preferably by a factor of 2, than the lateral extension of the passenger deck 12; see FIG. 4. The passenger compartment 14 is separated from the rest of the passenger volume 16 by lateral walls 15. The ceiling 17 and the floor 18 of the passenger compartment 14 are formed by the ceiling 19 and the floor 26 of the passenger deck 12, the height h of the passenger compartment 14 therefore corresponding to the height of the passenger deck 12. The volume of the passenger compartment 14 is preferably at most 1/10 of the passenger volume, i.e. of the volume of the passenger deck 12, and/or preferably at most 1/5 of the top volume 13 and/or at most 50 m³.

In the event of damage to the side wall 20 leading to a hole 21 in the region of the passenger compartment 14, the pressure in the passenger compartment 14 drops to the outside level within a very short space of time owing to the low volume of said passenger compartment. The entire pressure differential between the outside level and the cabin pressure is then applied to the walls 15, 17, 18, and without further intervention this may lead to structural failure of the walls 15, 17, 18, with potentially fatal consequences for passenger safety.

Figure 1:
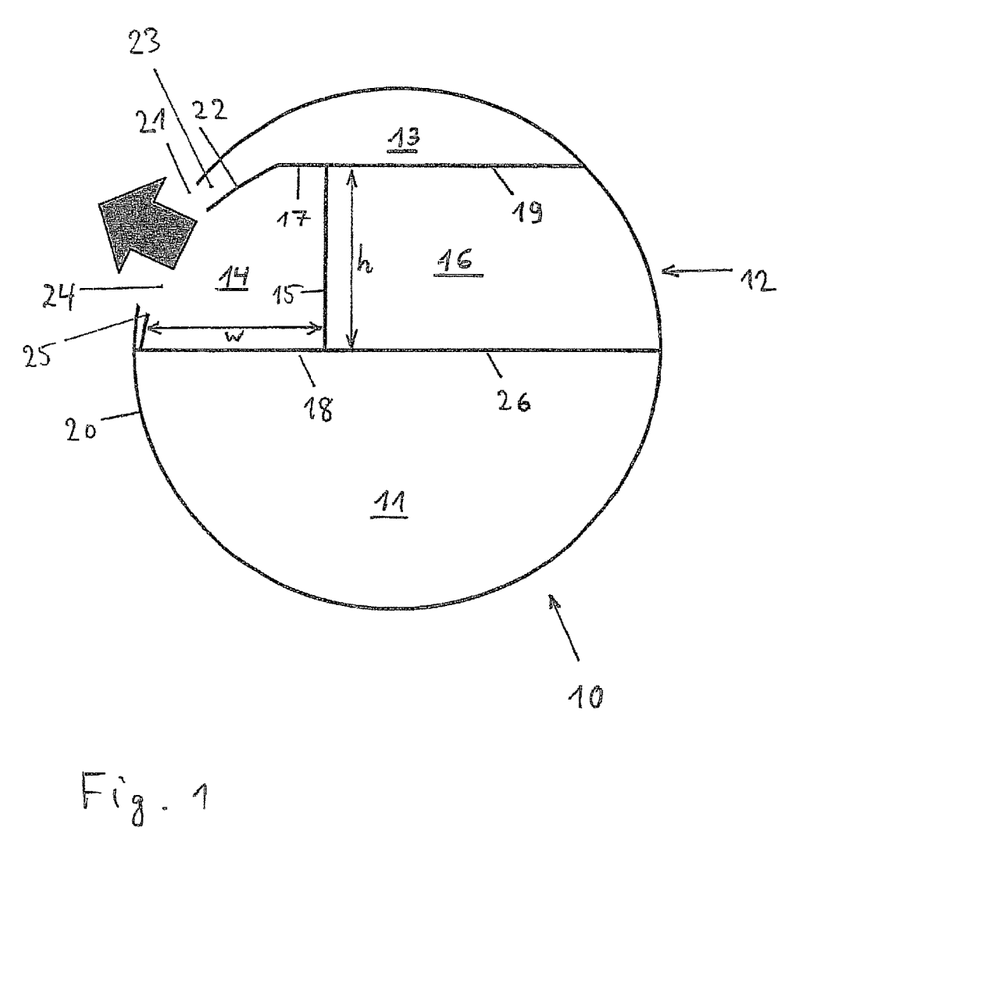
FIG. 1 is a cross-sectional view through a passenger aircraft according to the invention.

The invention is explained in the following on the basis of FIG. 1. According to the invention, the passenger compartment 14 is delimited towards the side wall 20 by an additional burstable wall 22. The burstable wall 22 advantageously extends from the floor 18 as far as the ceiling 17 of the passenger compartment 14. Said burstable wall is arranged so as to be adjacent to the side wall 20 and preferably follows the shape of said side wall, i.e. in cross section it advantageously forms a convex curve having a radius of curvature that is preferably smaller than the radius of curvature of the side wall 20.

Figure 2:
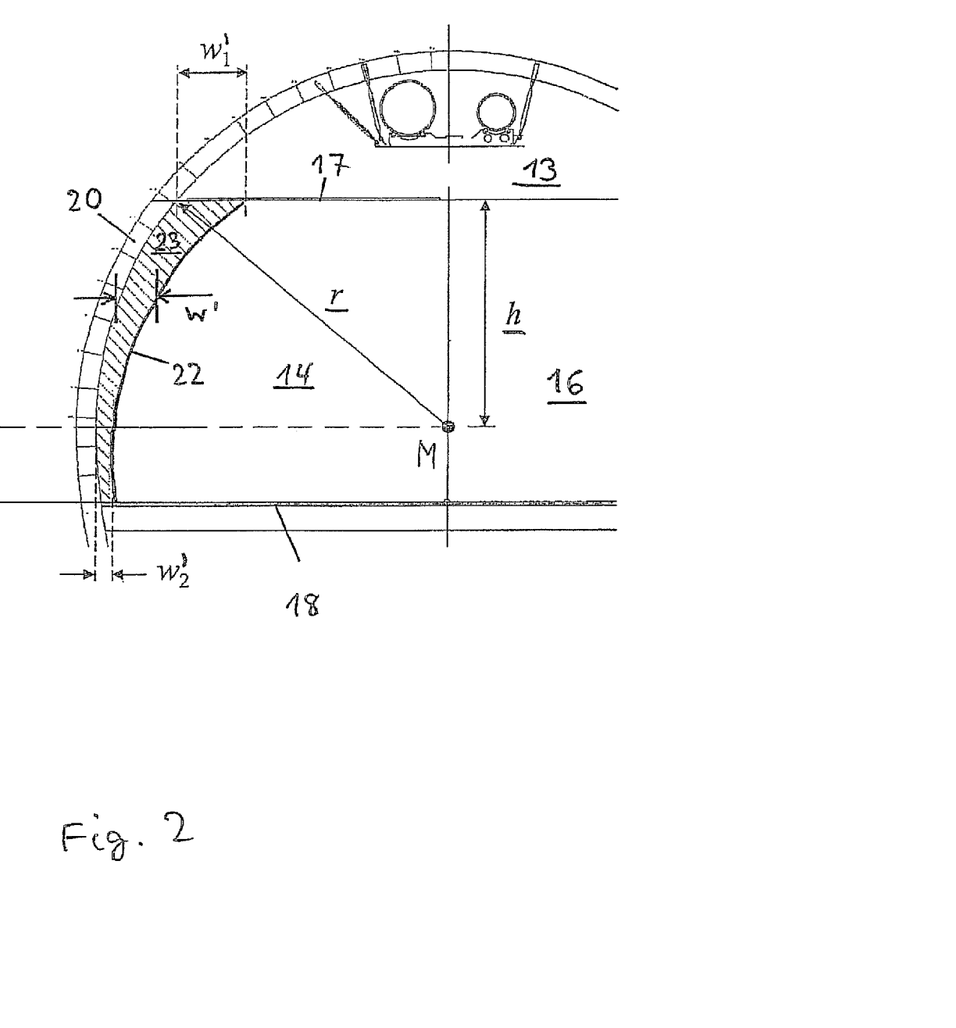
FIG. 2 is a detailed cross-sectional view through a detail of a passenger aircraft according to the invention.

A generally inaccessible connection space 23 is formed between the side wall 20 and the burstable wall 22 and is open towards the top volume 13, and specifically preferably over the entire geometric cross section between the connection space 23 and the top volume 13. In other words, the top volume 13 is drawn downwards at the side on the side wall 20 as low as floor level 18 of the passenger compartment 14. The burstable wall 22 is advantageously formed and arranged such that the clear cross-sectional width w' of the connection space 23 (see FIG. 2) advantageously increases from the bottom to the top, and specifically continuously increases so that the minimum distance $w_2'$ between the side wall 20 and the burstable wall 22 is advantageously at floor level and the maximum distance $w_1'$ is advantageously at ceiling level. This design ensures that, irrespective of the position of the opening 21 in the side wall 20, a flow connection (see below) that is as effective as possible is achieved between the top volume 13 and the passenger compartment 14, while at the same time as little space as possible is lost on account of the connection space 23.

As a result of damage leading to a hole 21 in the side wall 20, a corresponding hole 24 automatically (i.e. without further active intervention) develops in the burstable wall 22. This often occurs just by means of the primary mechanical damaging effect owing to the burstable wall 22 being arranged so as to be adjacent to the side wall 20. Advantageously, the burstable wall 22 has a lower bursting resistance than the walls 15, the ceiling 17, the floor 18 and the lateral walls of the passenger compartment 14, which do not lie in the sectional plane of the figure, and therefore when negative pressure caused by damage occurs in the connection space 23 relative to the passenger compartment 14, the burstable wall 22 also bursts in a controlled manner if the mechanical damaging effect does not reach the burstable wall 22. Advantageously, the burstable wall 22 has a predetermined breaking line 25, which is closed in itself and is for example circular, in order to produce at least one defined pressure-equalising opening 24 if a certain pressure differential between either side of the burstable wall 22 is exceeded.

Owing to the pressure-equalising opening 24 in the burstable wall 22 that is produced according to the invention, in the event of damage to the side wall 20 a pressure connection is produced between the passenger compartment 14 and the top volume 13 by means of the connection space 23. Owing to the considerable size of the top volume 13, the pressure in the connected volume 13, 23, 14 drops many times more slowly than in the prior art according to FIG. 1. This prevents the occurrence of extreme pressure differentials and corresponding secondary damage, and in addition valuable time is gained for emergency measures, such as providing oxygen masks.

The distance w' between the burstable wall 22 and the side wall 20 advantageously fulfils one or more of the following conditions in order to ensure the most rapid and comprehensive pressure equalisation possible between the passenger compartment 14 and the top volume 13.

The maximum distance $w_1'$ between the burstable wall and the side wall is advantageously at least $\sqrt{r^2-h^2}/8$, r being (see FIG. 2) the fuselage radius, starting from a central point M of the aircraft fuselage, to the point of intersection between the lower face of the ceiling 19 of the passenger deck 12 and the side wall 20, and h being the vertical distance between the level of the widest fuselage extension of the aircraft 10 and the lower face of the ceiling 19 of the passenger deck 12.

The minimum distance $w_2'$ between the burstable wall 22 and the side wall 20 is advantageously at least a quarter of the maximum distance between the burstable wall 22 and the side wall 20.

Figure 3:
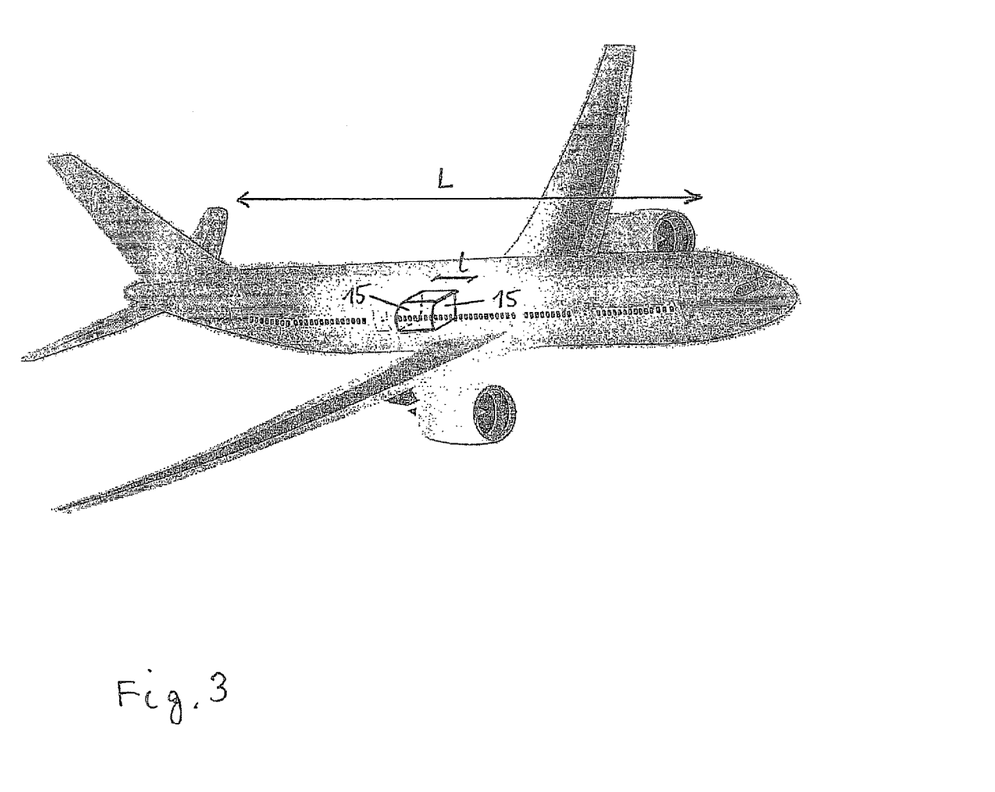
FIG. 3 is a perspective view of a passenger aircraft.
Figure 4:
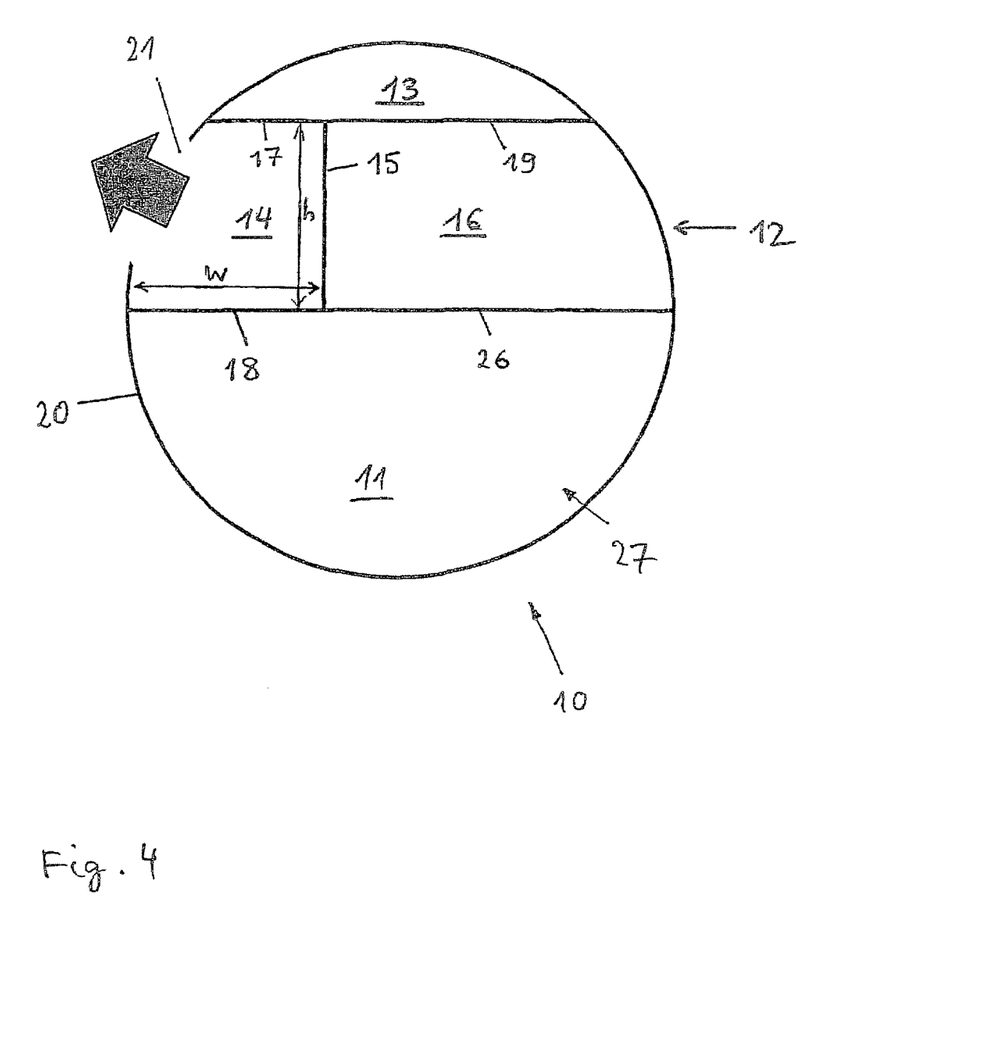
FIG. 4 is a cross-sectional view through a passenger aircraft according to the prior art.

The distance w' between the burstable wall 22 and the side wall 20 is advantageously at most half the length l of the passenger compartment 14 (see FIG. 3).

The distance between the burstable wall 22 and the side wall 20 is advantageously at least 0.05 m, more preferably at least 0.2 m.

Particularly advantageously, the maximum distance between the burstable wall and the side wall is at least $k\sqrt{r^2-h^2/4}$, k being a geometric factor which becomes greater the greater the volume of the passenger compartment and becomes smaller the longer the passenger compartment. The geometric factor k takes into account that passenger compartments may have very different volume-to-length ratios. Short spaces require greater cross-sectional widths than long spaces in order to achieve the same opening cross sections. Spaces having greater volumes require larger opening cross sections to the top volume in order to make possible an effective pressure connection between the volumes.

The geometric factor is preferably in the range of from 0.5 to 2, and is advantageously determined depending on the volume-to-length ratio $v/(m^2 \cdot l)$ of the passenger compartment 14. Suitable values for the geometric factor k are:

$v/(m^2 \cdot l) < 3 \; k=0.75$ $3 \leq v/(m^2 \cdot l) < 4.5 \; k=0.90$ $4.5 \leq v/(m^2 \cdot l) < 8.5 \; k=1.00$ $8.5 \leq v/(m^2 \cdot l) < 10 \; k=1.10$ $v/(m^2 \cdot l) \geq 10 \; k=1.25$ Instead of separating the geometric factor k into five values, it can also be separated into more or less than five values. The geometric factor k may for example also be determinable by means of a predefined function of $v/(m^2 \cdot l)$, for example a polynomial.

The invention claimed is:

1. A passenger aircraft, comprising:
   a pressurized cabin having a length,
   wherein the pressurized cabin is enclosed laterally and vertically by a side wall,
   wherein at least a portion of the length of the pressurized cabin comprises:
      a top volume;
      a passenger deck; and
      a lower deck,
   wherein the top volume and the passenger deck are separated vertically by a passenger deck ceiling,
   wherein the passenger deck and the lower deck are separated vertically by a passenger deck floor,
   wherein the top volume extends laterally from a first section of the side wall to a second section of the side wall,
   wherein the passenger deck extends laterally from the first section of the side wall to the second section of the side wall,
   wherein the lower deck extends laterally from the first section of the side wall to the second section of the side wall,
   wherein the top volume has a first volume,
   wherein the passenger deck has a passenger deck volume,
   wherein the passenger deck comprises:
      at least one passenger compartment;
   wherein the at least one passenger compartment has a corresponding at least one passenger compartment volume,
   wherein each passenger compartment of the at least one passenger compartment is separated from the rest of the passenger deck by a corresponding one or more walls of a corresponding at least one or more walls,
   wherein each passenger compartment of the at least one passenger compartment comprises a burstable wall of a corresponding at least one burstable wall,
   wherein each burstable wall of the at least one burstable wall extends within the corresponding passenger compartment from the passenger deck ceiling to the passenger deck floor and separates a connection space of a corresponding at least one connection space of the corresponding passenger compartment from the remainder of the corresponding passenger compartment,
   wherein each connection space of the at least one connection space extends laterally from the side wall to the corresponding burstable wall, and
   wherein each connection space of the at least one connection space opens to the top volume and forms a common pressure chamber therewith.

2. The passenger aircraft according to claim 1,
   wherein each passenger compartment of the at least one passenger compartment has a corresponding passenger compartment volume of a corresponding at least one passenger compartment volume that is less than or equal to 1/10 of the passenger deck volume.

3. The passenger aircraft according to claim 1,
   wherein each passenger compartment of the at least one passenger compartment has a corresponding passenger compartment volume of a corresponding at least one passenger compartment volume that is less than or equal to 1/5 of the first volume.

4. The passenger aircraft according to claim 1, wherein each passenger compartment of the at least one passenger compartment has a corresponding passenger compartment volume of a corresponding at least one passenger compartment volume that is less than or equal to 50 cubic meters.

5. The passenger aircraft according to claim 1, wherein each connection space of the at least one connection space extends vertically as low as the passenger deck floor.

6. The passenger aircraft according to claim 1,
   wherein for each connection space of the at least one connection space a corresponding lateral distance w' between the corresponding burstable wall and the side wall increases from a level of maximum fuselage width to a top of the each connection space of the at least one connection space.

7. The passenger aircraft according to claim 1,
   wherein each burstable wall of the at least one burstable wall is convex.

8. The passenger aircraft according to claim 1,
   wherein each burstable wall of the at least one burstable wall has a radius of curvature that is less than a radius of curvature of the side wall.

9. The passenger aircraft according to claim 1,
   wherein for each burstable wall of the at least one burstable wall a maximum distance $w_1'$ between the burstable wall and the side wall is at least $((r^2-h^2)^{1/2})/8$, where r is a fuselage radius to a point of intersection between a lower face of the passenger deck ceiling and the side wall, and h is a vertical distance between a level of a widest fuselage lateral width of the aircraft and the lower face of the passenger deck ceiling.

10. The passenger aircraft according to claim 1,
    wherein for each burstable wall of the at least one burstable wall a maximum distance $w_1'$ between the burstable wall and the side wall is at least $k((r^2-h^2)^{1/2})/4$, where r is a fuselage radius to a point of intersection between a lower face of the passenger deck ceiling and the side wall, where h is a vertical distance between a level of the widest fuselage lateral width of the aircraft and the lower face of the passenger deck ceiling, and k is a geometric factor which becomes greater the greater the passenger compartment volume of the corresponding passenger compartment becomes and becomes smaller the greater a length l of the corresponding passenger compartment becomes.

11. The passenger aircraft according to claim 1,
wherein for each burstable wall of the at least one burstable wall a minimum distance $w_2'$ between the burstable wall and the side wall in a region of a maximum fuselage lateral width is at least a quarter of a maximum distance $w_1'$ between the burstable wall and the side wall.

12. The passenger aircraft according to claim 1,
wherein for each burstable wall of the at least one burstable wall a distance w' between the burstable wall and the side wall is less than or equal to half a length l of the corresponding passenger compartment.

13. The passenger aircraft according to claim 1,
wherein for each burstable wall of the at least one burstable wall a minimum distance $w_2'$ between the burstable wall and the side wall is at least 0.05 m.

14. The passenger aircraft according to claim 1,
wherein each burstable wall of the at least one burstable wall has a corresponding bursting resistance that is lower than each bursting resistance of a one or more bursting resistances of the one or more walls of the corresponding passenger compartment.

15. The passenger aircraft according to claim 1,
wherein each burstable wall of the at least one burstable wall comprises a corresponding predetermined breaking line in order to produce a corresponding pressure-equalizing opening if a certain pressure differential between the corresponding connection space and the corresponding remainder of the passenger compartment is exceeded.

* * * * *

UNITED STATES PATENT AND TRADEMARK OFFICE
CERTIFICATE OF CORRECTION

PATENT NO. : 9,963,217 B2
APPLICATION NO. : 15/106681
DATED : May 8, 2018
INVENTOR(S) : Kai-Christoph Pfingsten and Arno Strotmann Page 1 of 1

It is certified that error appears in the above-identified patent and that said Letters Patent is hereby corrected as shown below:

In the Specification

Column 4,
Line 66, "distance between" should read --distance $w_1$' between--.

Signed and Sealed this
Nineteenth Day of February, 2019

Andrei Iancu
*Director of the United States Patent and Trademark Office*